April 28, 1964     J. W. ALEXANDER ETAL     3,131,160
AGGLOMERATION OF FINE RUBBER PARTICLES
Filed Oct. 3, 1960
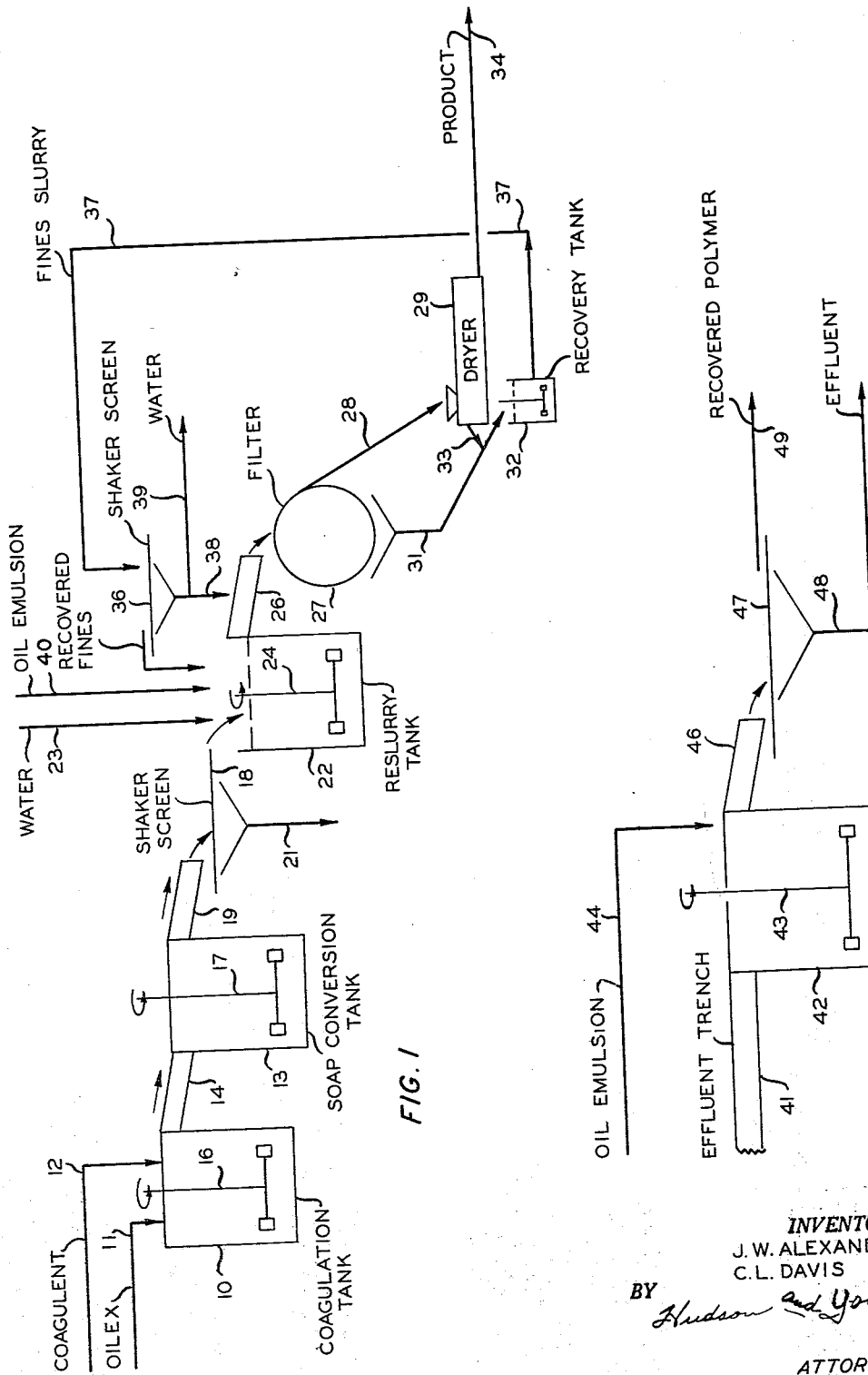
INVENTORS
J. W. ALEXANDER
C. L. DAVIS
BY *Hudson and Young*
ATTORNEYS 3,131,160
AGGLOMERATION OF FINE RUBBER PARTICLES
James W. Alexander and Charles L. Davis, Borger, Tex.,
assignors to Phillips Petroleum Company, a corporation of Delaware
Filed Oct. 3, 1960, Ser. No. 59,881
7 Claims. (Cl. 260—33.6)

This invention relates to a process for agglomerating fine rubber particles. In one aspect, the invention relates to the production of oil-rubber and oil and carbon black-rubber masterbatches. In another aspect, the invention relates to a process for producing such masterbatches wherein the losses resulting from fines are reduced.

In the production of oil-rubber and oil-carbon black-rubber masterbatches, an appreciable amount of the product is lost to the process in the form of fine rubber particles. A conventional operation in preparing such masterbatches involves separating coagulum from the serum, which is then usually discarded, and then washing the coagulum with water in a reslurry zone. After separation from the water, the coagulum can be conveniently dried in an extrusion drier. The water separated from the coagulum and a stream recovered from the extrusion drier feed section are recycled to the reslurry zone. As both of these recycle streams contain fines, an accumulation of fines in the reslurry zone results, rendering unsatisfactory the feed to the extrusion drier.

It is an object of this invention to provide a process for agglomerating the fine rubber particles so as to make possible their ultimate recovery.

Another object of the invention is to provide a process for the production of masterbatches wherein losses resulting from fines are reduced to a minimum.

Other and further objects and advantages of the invention will become apparent upon consideration of the accompanying disclosure and the drawing, in which FIGURES 1 and 2 are schematic representations of preferred embodiments of the invention.

In the rubber industry it is well known to prepare oil-rubber and oil-carbon black-rubber masterbatches by a latex masterbatching operation. The preparation of such masterbatches involves blending an oil emulsion or an oil emulsion and carbon black slurry with a rubber latex after which the mixture is coagulated. The oil emulsion and latex mixture and the oil emulsion and carbon black slurry latex mixture are in the trade known, respectively, by the terms "oilex" and "carbexo." While the invention will be discussed hereinafter with relation to oil extended rubber, it is to be understood that it applies broadly to oil-containing compositions, e.g., carbon black-oil-rubber compositions. In the usual operating procedure, the oilex is first passed into a coagulation tank where a coagulant, such as brine-acid, is added after which it is transferred to a soap conversion zone. In the soap conversion zone, sufficient time is allowed for the conversion of the soap to acid. It is, of course, within the scope of the invention to use any suitable coagulation system. The mixture is passed from the soap conversion zone to a shaker screen where rubber crumb containing oil is separated from the serum. The serum, which contains some fines, is usually discarded although it can be recycled to the coagulation zone. Rubber crumb remaining on the shaker screen is passed to a reslurry zone wherein it is washed with water. The crumb is then separated from the water, the water containing fines being usually discarded while the crumb is passed to a drying zone. When using an extrusion drier in the drying operation, a stream containing fines is recovered from the extrusion feed section. If this stream is recycled to the reslurry zone, fines accumulate therein, resulting in an unsatisfactory feed for the extrusion drier.

In accordance with the present invention, a method is provided which makes it possible to recover as useful product the fines which in conventional masterbatching operations must be discarded as waste.

The present invention resides in a process for agglomerating fine rubber particles. Broadly speaking, the process comprises the steps of adding oil, preferably an oil emulsion, to a water slurry of rubber fines containing oil, and agitating the resulting mixture so as to agglomerate the fines. In a masterbatching operation, agglomeration of the fines makes it possible to recover them as a part of the product of the process. The oil used in the practice of this invention is the same type used in preparing the oilex or carbexo in a masterbatching operation. Suitable extender oils, which are well known in the art, include aromatic, paraffinic and naphthenic hydrocarbons, usually having a specific gravity between 0.95 and 1.05 and an initial boiling point of about 550° F.

A more complete understanding of the invention can be obtained by referring to FIGURE 1 of the drawing. As shown in FIGURE 1, a mixture of latex and oil emulsion is supplied to coagulation tank 10 through line 11. A coagulant is introduced into the tank by means of line 12. With a mixture of latex and oil emulsion, it is preferred to use dilute sulphuric acid and dilute brine as the coagulant. Dilute sulphuric acid and glue are preferred as the coagulant when processing a mixture of latex and carbon black and oil. The effluent from coagulation tank 10 is passed to soap conversion tank 13 by means of conduit 14. The coagulation tank and the soap conversion tank are each provided with suitable stirring means 16 and 17. The mixture remains in the soap conversion tank for a time sufficient for the conversion of the soap to acid. Soaps suitable for use in the process include the alkali metal or ammonium stearates, oleates, rosinates, and the like. It is to be understood also that other emulsifiers such as alkali metal aralkyl sulfonates, aryl sulfonates, sodium lignin sulfonates, mercaptan ethylene oxide condensation products, phenol ethylene oxide condensation products, and the like can be used. Mixtures of emulsifiers are also frequently employed. As the emulsifier or mixture thereof is varied, it will in some instances be necessary to vary also the coagulation systems. For example, alcohols are utilized as coagulation agents in some cases.

From soap conversion tank 13, the mixture of oil-containing rubber crumb and liquid is passed to shaker screen 18 by means of conduit 19. The shaker screen is vibrated by means of a motor (not shown). Liquid separated from the rubber crumb is recovered through line 21. This liquid or serum contains fine rubber particles, and in the usual plant operation the liquid is usually discarded. However, as will be described in detail in conjunction with FIGURE 2, in accordance with this invention, the serum recovered through line 21 is treated so as to agglomerate the fines and make possible their recovery.

The rubber crumb which separates out on shaker screen 18 is thereafter passed into reslurry tank 22. In the reslurry tank, the rubber crumb is washed with water which is supplied through line 23. A stirring means 24 is provided in order to maintain good contact between the materials present in the reslurry tank. A slurry of rubber crumb in water is recovered from reslurry tank 22 through conduit 26 and then passed to filter 27. Filter 27 is conveniently shown as being a rotary vacuum filter through other types of filters can be utilized in this operation. The rubber crumb separated from the slurry by means of filter 27 is passed through line 28 to the feed section of extrusion drier 29. An extruder suitable for use in the drying operation is described in U.S. Patent No. 2,519,014. The water separated from the slurry in filter 27 is removed therefrom through line 31 and then passed into recovery tank 32. The tank removed from the filter contains fine rubber particles. Liquid containing fine rubber particles is also recovered from the feed section of the extrusion drier through line 33. This stream containing rubber fines is also passed into recovery tank 32 through line 31. The dried product is recovered from the extrusion drier through line 34 after which it is passed to suitable equipment for further processing.

The slurry of fines in water in recovery tank 32 is recycled to shaker screen 36 by means of line 37. The fines which are separated out on shaker screen 36 are passed into reslurry tank 22. The liquid from the recycled stream is recovered through line 38 and thereafter passed to filter 27 through conduit 26. Line 39 attached to line 38 provides means for removing excess water which builds up in the system.

When conducting a masterbatching operation in the above-described manner, fines accumulate in the reslurry tank. The presence of a large quantity of fines renders the feed to the extrusion drier unsatisfactory with the result that in the usual operation it becomes necessary to discard at least part of the recycle stream from the recovery tank in order to maintain a proper level of fines concentration. In accordance with the present invention, a method is provided whereby the fines which are recirculated to the reslurry tank are agglomerated, thereby providing rubber crumb of a size suitable as a feed for the extrusion drier. Thus, an oil emulsion is introduced into the reslurry tank through line 40. The presence of the oil emulsion in the reslurry tank has been found to cause agglomeration of the fine particles of rubber present in that tank. The amount of oil emulsion introduced into the reslurry tank varies with the type of polymer used in the process. The correct amount to add and can be conveniently adjusted by observing the effluent from the reslurry tank. Thus, the rate of oil emulsion introduction is adjusted so as to obtain a clear serum or effluent from the reslurry tank. In general, in the range of 0.5 to 4 weight percent of oil emulsion, based on the amount of solids present in the recycle stream, is sufficient to provide for agglomeration of the fines in the tank. The oil emulsion usually contains from 5 to 25 weight percent, preferably 15 to 20 weight percent oil. The flow of materials into and from the reslurry tank is preferably adjusted so as to provide a residence time therein of from 3 to 4 minutes. The majority of the fine rubber particles recycled to the reslurry tank have a diameter of 1/16 inch or less. The size of the agglomerated particles vary from 1/8 to 3/4 inch diameter and in some cases may be up to 1 inch in diameter.

Referring now to FIGURE 2 of the drawing, the applicability of the instant invention to the treatment of any stream containing fine rubber particles is illustrated. Waste streams from a plant operation, such as the liquid recovered through line 21 and line 39 of the apparatus of FIGURE 1, are passed into effluent trench 41. The liquid containing fines is flowed from trench 41 into tank 42 which is provided with a suitable stirring means 43. An oil emulsion is introduced into tank 42 through line 44, and, as described hereinbefore, the presence of the oil emulsion causes the rubber fines to agglomerate. The agglomerated fines are withdrawn from tank 42 through conduit 46 as a slurry. The slurry is flowed onto shaker screen 47, the rubber crumb in the form of agglomerated fines remaining on the screen while the liquid is recovered through line 58. The liquid withdrawn through line 48 is discarded while the agglomerated particles are passed from the shaker screen through line 49 to further processing equipment such as an extrusion drier.

A more comprehensive understanding of the invention can be obtained by referring to the following illustrative examples which are not intended, however, to be unduly limitative of the invention.

EXAMPLE I

Butadiene and styrene are copolymerized in aqueous emulsion at 41° F. in accordance with the following recipe:

Recipe

| | Parts by weight |
|---|---|
| Butadiene | 72 |
| Styrene | 28 |
| Water | 180 |
| Rosin soap, K salt | 4.5 |
| KOH | 0.1 |
| KCl | 0.4 |
| Tamol N [1] | 0.1 |
| Sequestrene AA [2] | 0.02 |
| $FeSO_4 \cdot 7H_2O$ | 0.01 |
| $NaSO_2CH_2OH \cdot 2H_2O$ [3] | 0.05 |
| p-Menthane hydroperoxide | 0.05 |
| Tert-dodecyl mercaptan | 0.23 |

[1] Sodium salt of a naphthalene sulfonic acid-formaldehyde condensation product.
[2] Ethylenediamine tetraacetic acid.
[3] Sodium formaldehyde sulfoxylate.

The reaction is shortstopped with 0.15 part Thiostop N (sodiumdimethyldithiocarbamate), based on the monomers, and 1.5 parts by weight of phenyl-beta-naphthylamine antioxidant is added per 100 parts of rubber. A conversion of 60 percent is obtained in 15.2 hours. A polymer thus prepared has a Mooney value (ML-4) of approximately 58.

Oil emulsion containing 67 weight percent oil and 33 weight percent water is blended with the rubber latex containing 20 weight percent rubber and 80 weight percent water. The emulsion and latex are blended to provide 27.3 parts by weight oil and 72.7 parts by weight rubber. This oilex is fed to a coagulation tank at the rate of 1725 gallons per hour (175 g.p.h. oil emulsion and 1550 g.p.h. latex). Dilute sulfuric acid and dilute brine are added to the coagulation tank to coagulate the rubber containing oil. The effluent from the coagulation tank is passed into the soap conversion tank where conversion of the soap to acid occurs. The effluent from the soap conversion tank is passed onto a shaker screen for separation of the rubber crumb. Rubber crumb from the shaker screen is transferred to a reslurry tank where it is washed with water. An oil emulsion containing about 18 weight percent oil is charged to the reslurry tank at the rate of 3 gallons per minute. The slurry of rubber crumb in water is passed from the reslurry tank to a filter for separation of rubber crumb from the liquid. The separated rubber crumb recovered from the filter is charged to the feed section of an extrusion drier. The liquid from the filter is passed into a recovery tank, and a stream from the feed section of the extrusion drier is also introduced into this tank. The liquid in the recovery tank contains rubber fines, and this liquid is pumped to a shaker screen. The fines which collect on the shaker screen are passed into the reslurry tank wherein they are agglomerated upon being contacted therein with the oil emulsion. A dry rubber product is recovered from the extrusion drier at the rate of 3000 pounds per hour. When conducting the masterbatch operation without agglomerating the rubber fines in the reslurry tank, only about 2700 pounds per hour of dry rubber product is recovered.

EXAMPLE II

A masterbatching operation is also carried out in which an oil emulsion and carbon black slurry is blended with the rubber latex. The oil emulsion contains 18 weight percent oil and 82 weight percent water while the latex contains 20 weight percent rubber and 80 weight percent water. The carbon black slurry contains 12.5 weight percent carbon black and 87.5 weight percent water. The materials are blended so as to obtain 17 parts by weight oil, 34 parts by weight carbon black and 49 parts by weight rubber. These materials are charged to the coagulation tank at the following rates:

|  | G.p.h. |
|---|---|
| Oil emulsion | 403 |
| Carbon black slurry | 1120 |
| Latex | 1046 |
| Total | 2569 |

The same procedure as described in Example I is followed in this run in recovering the rubber fines and producing a dry rubber product.

While the present invention has been described specifically with relation to a copolymer of butadiene and styrene, it is to be understood that the invention is broadly applicable to those polymers and copolymers which are rubbery in nature. These polymers are produced by polymerization of monomeric material which generally contain the characteristic structure $CH_2=C=$ and, in most cases, have at least one of the disconnected valence bonds attached to an electronegative group, i.e., a group which increases the polar character of the molecule such as a chlorine group or an organic group containing a double or triple bond such as vinyl, phenyl, cyano, carboxy or the like. Included in this chain of monomers are the conjugated dienes such as butadiene, 2,3-dimethyl-1,3-butadiene, isoprene, piperylene, 2-furyl-1,3-butadiene, 2-methoxy-1,3-butadiene and the like; haloprenes such as chloroprene (2-chloro-1,3-butadiene), bromprene, methylchloroprene (2-chloro-3-methyl-1,3-butadiene), and the like; aryl olefins such as styrene, various alkyl styrenes, p-chlorostyrene, p-methoxy-styrene, alpha-methylstyrene, vinylnaphthalene and similar derivatives thereof, and the like, acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinyl ethynyl, alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the type described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diene with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber, although, as can be readily deduced from the foregoing, there is a host of possible reactants, the most readily and commercially available monomers at present are butadiene itself (1,3-butadiene) and styrene. With these specific monomers, it is usually preferred to use them together, in relative ratios of butadiene to styrene between 25:75 and 95:1 parts by weight.

Other and further objects and advantages of the invention will become apparent upon consideration of the foregoing disclosure. Such modifications and advantages clearly come within the spirit and scope of the invention.

We claim:
1. In a process for preparing dry rubbery diene polymer compositions containing oil wherein a rubbery diene polymer crumb containing oil is washed in a reslurry zone with water, water containing rubbery diene polymer fines is separated from said crumb, said separated rubbery diene polymer crumb is passed into a drying zone, and dry rubbery diene polymer crumb and water containing rubbery diene polymer fines are separately recovered from said drying zone, the improvement which comprises separating fines from said water separated from said rubbery diene polymer crumb and from said water recovered from said drying zone; passing said fines into said reslurry zone containing said rubbery diene polymer crumb and water; introducing an emulsion of rubber extender oil in water into said reslurry zone; and agitating the resulting mixture.

2. The process of claim 1 wherein a filtration zone is used to separate fines from the water separated from said rubbery diene polymer crumb and from the water recovered from said drying zone.

3. In a process for preparing dry rubbery diene polymer compositions containing oil which comprises mixing rubbery diene polymer latex with an oil emulsion; coagulating solids in the resulting mixture in a coagulation zone; separating the resulting rubbery diene polymer crumb containing oil from said mixture in a first separation zone; washing said rubbery diene polymer crumb with water in a reslurry zone; passing a slurry of said rubbery diene polymer crumb in water into a filter zone; separating water containing fines from said rubbery diene polymer crumb in said filter zone; passing said rubbery diene polymer crumb from said filter zone to a drying zone; recovering water containing fines from said drying zone, and recovering dry rubbery diene polymer crumb from said drying zone, the improvement which comprises passing said water containing fines from said filter zone to a recovery zone; passing said water containing fines recovered from said drying zone to said recovery zone; passing water containing fines from said recovery zone to a second separation zone; separating fines from water in said second separation zone; passing said separated fines into said reslurry zone; introducing an emulsion of rubber extender oil into said reslurry zone; and agitating the resulting mixture contained in said reslurry zone.

4. The process of claim 3 wherein said second separation zone is a filtration zone.

5. The process according to claim 3 in which said water separated in said second separation zone is passed into said filter zone.

6. The process according to claim 3 in which said rubber latex is mixed with an oil emulsion and a slurry of carbon black in water.

7. The process according to claim 3 in which said oil includes aromatic, paraffinic and naphthenic hydrocarbons and has a specific gravity between 0.95 and 1.05 and an initial boiling point of about 550° F.

References Cited in the file of this patent
UNITED STATES PATENTS

| 2,915,489 | White | Dec. 1, 1959 |
| 2,979,481 | Hammer | Apr. 11, 1961 |
| 3,079,360 | Sutherland | Feb. 26, 1963 |